United States Patent
Rajan et al.

(10) Patent No.: US 8,621,172 B2
(45) Date of Patent: *Dec. 31, 2013

(54) SYSTEM AND METHOD FOR RECLAIMING UNUSED SPACE FROM A THINLY PROVISIONED DATA CONTAINER

(75) Inventors: Vijayan Rajan, Sunnyvale, CA (US); David Brittain Bolen, Durham, NC (US); Douglas P. Doucette, Freeland, WA (US)

(73) Assignee: NetApp, Inc., Sunnyvale, CA (US)

( * ) Notice: Subject to any disclaimer, the term of this patent is extended or adjusted under 35 U.S.C. 154(b) by 487 days.

This patent is subject to a terminal disclaimer.

(21) Appl. No.: 12/471,822

(22) Filed: May 26, 2009

(65) Prior Publication Data
US 2009/0248763 A1 Oct. 1, 2009

Related U.S. Application Data

(63) Continuation of application No. 10/966,605, filed on Oct. 15, 2004, now Pat. No. 7,603,532.

(51) Int. Cl.
*G06F 13/00* (2006.01)
(52) U.S. Cl.
USPC .................................. 711/166; 711/E12.009
(58) Field of Classification Search
USPC .......................................... 711/166, E12.009
See application file for complete search history.

(56) References Cited

U.S. PATENT DOCUMENTS

| | | | |
|---|---|---|---|
| 4,156,907 A | 5/1979 | Rawlings et al. | |
| 4,399,503 A | 8/1983 | Hawley | |
| 4,598,357 A | 7/1986 | Swenson et al. | |
| 4,688,221 A | 8/1987 | Nakamura et al. | |
| 4,698,808 A | 10/1987 | Ishii | |
| 4,761,785 A | 8/1988 | Clark et al. | |
| 4,805,090 A | 2/1989 | Coogan | |
| 4,837,675 A | 6/1989 | Bean et al. | |
| 4,864,497 A | 9/1989 | Lowry et al. | |
| 4,896,259 A | 1/1990 | Jacobs et al. | |

(Continued)

FOREIGN PATENT DOCUMENTS

| | | |
|---|---|---|
| JP | 03-138737 | 6/1991 |
| JP | 08-063376 | 3/1996 |

(Continued)

OTHER PUBLICATIONS

Kim, Chang-Soo et al., "Volume Management in SAN Environment", Parallel and Distributed Systems, 2001. ICAPDS 2001. Proceedings. Eighth International Conference on Jun. 26-29, 2001. Piscataway, NJ, IEEE, Jun. 26, 2001.

(Continued)

*Primary Examiner* — Edward Dudek, Jr.
(74) *Attorney, Agent, or Firm* — Cesari and McKenna, LLP

(57) ABSTRACT

A method for operating a computer storage system maintains a client computer interacting with the storage system, the client computer storing data on a data storage device of the computer storage system. Locating, by a client-side agent executing on the client computer that examines metadata of the client computer, one or more sets of blocks allocated and then deleted, hereinafter referred to as deleted blocks, within the computer storage system. Sending a command to the storage system, the command to identify the deleted blocks within the computer storage system. Deallocating, in response to receiving the command, the identified deleted blocks within the computer storage system.

17 Claims, 10 Drawing Sheets

(56) References Cited

U.S. PATENT DOCUMENTS

| | | | |
|---|---|---|---|
| 4,899,342 | A | 2/1990 | Potter et al. |
| 4,989,206 | A | 1/1991 | Dunphy, Jr. et al. |
| 5,124,987 | A | 6/1992 | Milligan et al. |
| RE34,100 | E | 10/1992 | Hartness |
| 5,155,835 | A | 10/1992 | Belsan |
| 5,426,747 | A | 6/1995 | Weinreb et al. |
| 5,581,724 | A | 12/1996 | Belsan et al. |
| 6,636,879 | B1 | 10/2003 | Doucette et al. |
| 6,658,437 | B1* | 12/2003 | Lehman ................................ 1/1 |
| 2002/0112022 | A1 | 8/2002 | Kazar et al. |
| 2002/0112113 | A1 | 8/2002 | Karpoff et al. |
| 2002/0161982 | A1* | 10/2002 | Riedel ........................... 711/170 |
| 2003/0009619 | A1 | 1/2003 | Kano et al. |
| 2004/0187098 | A1 | 9/2004 | Garg et al. |
| 2005/0246401 | A1* | 11/2005 | Edwards et al. .............. 707/205 |

FOREIGN PATENT DOCUMENTS

| | | |
|---|---|---|
| JP | 2005085985 A | 3/2005 |
| JP | 4301822 B2 | 7/2009 |
| WO | WO-89/10594 | 11/1989 |
| WO | WO2004008322 A1 | 1/2004 |

OTHER PUBLICATIONS

Hough, Geoffrey. "3PAR Thin Provisioning Eliminating Allocated But Unused Storage" White Paper, (Online), Jun. 2003, XP-002387038. Retrieved from the Internet: URL:http//www.3par.com/documents/3PAR-tp-wp-.01.1.pdf.

Alliot, S. International Search Report for International Application No. PCT/US2005/037093, Jun. 26, 2006.

Administration Guide found at http://www.openafs.org/pages/doc/AdminGuide/auagd010.htm, visited on Mar. 2, 2005.

Basilico, et al., *Error Correction System Using "Shadow Memory,"*IBM Technical Disclosure Bulletin, May 1984, pp. 5792-5793.

Bitton, Dina, *Disk Shadowing*, Proceedings of the 14th VLDB Conference, LA, CA (1988).

Blasgen, M.W. et al., *System R:An architectural Overview*,Reprinted from IBM Systems Journal vol. 20, No. 1, 1981©1981, 1999.

Borenstein, Nathaniel S., *CMU's Andrew project a retrospective*, Communications of ACM, (39)12, Dec. 1996.

Brown, Mark R. et al., *The Alpine file system*, ACM Transactions on Computing Systems, 3(4):261-293, Nov. 1985.

Chen, Peter M., et al., *An Evaluation of Redundant Arrays of Disks Using an Amdahl 5890* Performance Evaluation, pp. 74-85, 1990.

Chutani, Sailesh, et al., *The Episode file system*, In Proceedings of the USENIX Winter 1992.

Clark, B.E., et al., *Application System /400 Performance Characteristics*, IBM Systems Journal, 28(3): 407-423, 1989.

Data Sheet for the Check Point Software Technologies product Flood-Gate-1 (1997).

Dibble, Peter C., et al., *Beyond Striping: The Bridge Multiprocessor File System*, Computer Science Department, University of Rochester, Aug. 11, 1989.

Douglis, Fred, et al., *A comparison of two distributed systems: Amoeba and Sprite*—Computing Systems, 4(4), Fall 1991, pp. 353-385 ?{article I have has no date or cite}.

Gait, Jason, Phoenix: *A Safe In-Memory File System*. Communications of the ACM, 33(1):81-86, Jan. 1990.

Hartman, John H. et al., *Performance Measurements of a Multiprocessor Sprite Kernel*, Proceedings of the USENIX Conference, 1990.

Hitz, Dave et al., *File System Design for an NFS File Server Appliance*, Technical Report 3002, Rev. C395, presented Jan. 19, 1994.

Howard, John H, et al. *Scale and Performance in a Distributed File System*, Carnegie Mellon University, CMU-ITC-87-068, Aug. 5, 1987.

Howard, John, H. et al., *Scale and performance in a distributed file system*, ACM Trans. Computer. System., 6(1), Feb. 1988 pp. 51-81.

Howard, John H., *An Overview of the Andrew File System*, Carnegie Mellon University, CMU-ITC-88-062.

The IBM System/38, Chapter 8, pp. 137-15.

Isomaki, Markus, *Differentiated Service for the Internet*, Department of Technical Physics and Mathematics, May 9, 1998.

Kazar, Michael L., et al., *Decorum File System Architectural Overview*, USENIX Summer Conference, Anaheim, California, 1990.

Lomet, David., et al., *The performance of a multiversion access method*, ACM SIGMOD International Conference on Management of Data, 19:353-363.

Lorie, Raymond, A, *Physical integrity in a large segmented database*, ACM Trans. Database Systems, (2)1:91-104, Mar. 1977.

Lorie, RA, *Shadow Page Mechanism*, IBM Technical Disclosure Bulletin, Jun. 1986, pp. 340-342.

McKusick, Marshall Kirk, et al., *A Fast File System for UNIX*, Computer Science Division, Department of Electrical Engineering and Computer Sciences, Univ. of CA, Berkley, Feb. 18, 1994.

Miller, Ethan L., et al., *RAMA:A File System for Massively Parallel Computers*, 12th IEEE Symposium on Mass Storage Systems, Monterey CA, Apr. 1993, pp. 163-168.

Moons, Herman et al., *Location-Independent Object Invocation in Open Distributed Systems*, Autumn 1991 EurOpen Technical Conference and Exhibition, pp. 287-300 (Sep. 16-20, 1991).

Morris, James H., et al, *Andrew: A Distributed Personal Computing Environment*, Comm. of the ACM, vol. 29, Mar. 1986, pp. 184-201.

Mullender, Sape J., et al., *A distributed file service based on optimistic concurrency control*, ACM Symposium on Operating System Principles (Orcas Island, Washington). Published as Operating Systems Review, 19(5):51-62, Dec. 1985.

Muller, Keith, et al., *A High Performance Multi-Structured File System Design*, In Proceedings of the 13th ACM Symposium on Operating Systems Principles, Oct. 1991, pp. 56-67.

Ousterhout, John K. et al., *The Sprite Network Operating System*, Computer Science Division, Department of Electrical Engineering and Computer Sciences, Univ. of CA, Berkley, Nov. 19, 1987.

Ousterhout, John et al., *Beating the I/O Bottleneck: A Case for Log-Structured File Systems*, Technical Report, Computer Science Division, Electrical Engineering and Computer Sciences, University of California at Berkeley, Oct. 30, 1988.

Ousterhout, John, *Why Aren't Operating Systems Getting Faster as Fast as Hardware?*, Digital WRL Technical Note TN-11, Oct. 1989.

Ousterhout, John, *A Brief Retrospective on The Sprite Network Operating System*, found at http://www.cs.berkeley.edu/projects/sprite/retrospective.html.visited on Mar. 11, 2005.

Patterson, D., et al., *A Case for Redundant Arrays of Inexpensive Disks (RAID)*, Technical Report, CSD-87-391, Computer Science Division, Electrical Engineering and Computer Sciences, University of California at Berkeley (1987).

Patterson, D., et al., *A Case for Redundant Arrays of Inexpensive Disks (RAID)*, SIGMOD International Conference on Management of Data, Chicago, IL, USA, Jun. 1-3, 1988, SIGMOD Record (17)3:109-16 (Sep. 1988).

Peterson, Zachary Nathaniel Joseph, *Data Placement for Copy-on-Write Using Virtual Contiguity*, University of CA, Santa Cruz, Master of Science in Computer Science Thesis, Sep. 2002.

Quinlan, Sean, *A Cached WORM File System*, Software-Practice and Experience, 21(12):1289-1299 (1991).

Redundant Array of Independent Disks, from Wikipedia, the free encyclopedia, found at http://en.wikipedia.org/wiki/RAID, visited on Mar. 9, 2005.

Rosenberg, J., et al., *Stability in a Persistent Store Based on a Large Virtual Memory*, In Security and Persistence, Rosenber, J. & Keedy, J.L. (ed), Springer-Verlag (1990) pp. 229-245.

Rosenblum, Mendel, et al., *The LFS Storage Manager*, Computer Science Division, Electrical Engin. and Computer Sciences, Univ. of CA, presented at Summer '90 USENIX Technical Conference, Anaheim, CA Jun. 1990.

Rosenblum, Mendel, et al, *The Design and Implementation of a Log-Structured File System* Jul. 24, 1991 pp. 1-15.

Rosenblum, Mendel, et al., *The Design and Implementation of a Log-Structured File System*, , In Proceedings of ACM Transactions on Computer Systems, (10)1:26-52, Feb. 1992.

(56) References Cited

OTHER PUBLICATIONS

Sandberg, Russel et al., *Design and implementation of the Sun Network Filesystem*. In Proc Summer 1985 USENIX Conf., pp. 119-130, Portland OR (USA), Jun. 1985.
Santry, Douglas S., et al., *Deciding When to Forget in the Elephant File System*, Operating Systems Reviews 34(5), (Dec. 1999) pp. 110-123.
Satyanarayanan, M., et al., *The ITC Distributed File System: Principles and Design*, In Proceedings of the 10th ACM Symposium on Operating Systems Principles, (19)5:56-67, Dec. 1985.
Satyanarayanan,.M.. *A survey of distributed file-systems*. Annual Review of Computing Science, 4(73-104), 1989.
Satyanarayanan, M., et al, *Coda: A highly available file system for a distributed workstation environment* Carnegie Mellon University, CMU-ITC.
Satyanarayanan, M., et al, *Coda: A highly available file system for a distributed workstation enviroment*. IEEE Transactions on Computers, 39(4):447-459, 1990.
Satyanarayanan, Mahadev, *Scalable, Secure, and Highly Available Distributed File Access*, Computer May 1990: 9-21.
Sidebotham, Bob, *Volumes: The Andrew File System Data Structuring Primitive*, EEUG Conference Proceedings, Manchester, UK, Autumn 1986.
User Guide found at http://www.openafs.org/pages/doc/UserGuide/auusg004.htm visited on Mar. 2, 2005.
Welch, Brent B., et al., *Pseudo Devices: User-Level Extensions to the Sprite File System*, Computer Science Division, Department of Electrical Engineering and Computer Sciences, Univ. of CA, Berkley, Apr. 1988.
Welch, Brent B., et al., *Pseudo-File-Systems*, Computer Science Division, Department of Electrical Engineering and Computer Sciences, Univ. of CA, Berkley, Oct. 1989.
Wittle, Mark, et al, *LADDIS: The next generation in NFS file server benchmarking*, USENIX Association Conference Proceedings, Apr. 1993.
PCT Notification of Transmittal of the International Search Report and the Written Opinion of the International Searching Authority, International Application No. PCT / US2005 / 037093, mailed Jul. 12, 2006, 6 pages.
"SCSI command" http://en.wikipedia.org/wiki/SCSI_command, retrieved Jun. 19, 2007, 5 pages.

\* cited by examiner

SYSTEM AND METHOD FOR RECLAIMING UNUSED SPACE FROM A THINLY PROVISIONED DATA CONTAINER

RELATED APPLICATION

This application is a continuation of U.S. patent application Ser. No. 10/966,605, filed by Vijayan Rajan et al. on Oct. 15, 2004, entitled SYSTEM AND METHOD FOR RECLAIMING UNUSED SPACE FROM A THINLY PROVISIONED DATA CONTAINER now issued as U.S. Pat. No. 7,603,532 on Oct. 13, 2009.

FIELD OF THE INVENTION

The present invention relates to storage systems and, in particular, to reclaiming unused space from a thinly provisioned data container on a storage system.

BACKGROUND OF THE INVENTION

A storage system is a computer that provides storage service relating to the organization of information on writable persistent storage devices, such as memories, tapes or disks. The storage system is commonly deployed within a storage area network (SAN) or a network attached storage (NAS) environment. When used within a NAS environment, the storage system may be embodied as a file server including an operating system that implements a file system to logically organize the information as a hierarchical structure of directories and files on, e.g. the disks. Each "on-disk" file may be implemented as a set of data structures, e.g., disk blocks, configured to store information, such as the actual data for the file. A directory, on the other hand, may be implemented as a specially formatted file in which information about other files and directories are stored. As used herein a file is defined to be any logical storage container that contains a fixed or variable amount of data storage space, and that may be allocated storage out of a larger pool of available data storage space. As such, the term file, as used herein and unless the context otherwise dictates, can also mean a container, object or any other storage entity that does not correspond directly to a set of fixed data storage devices. A file system is, generally, a computer system for managing such files, including the allocation of fixed storage space to store files on a temporary or permanent basis.

The storage system may be further configured to operate according to a client/server model of information delivery to thereby allow many client systems (clients) to access shared resources, such as files, stored on the storage system. Sharing of files is a hallmark of a NAS system, which is enabled because of its semantic level of access to files and file systems. Storage of information on a NAS system is typically deployed over a computer network comprising a geographically distributed collection of interconnected communication links, such as Ethernet, that allow clients to remotely access the information (files) on the filer. The clients typically communicate with the storage system by exchanging discrete frames or packets of data according to pre-defined protocols, such as the Transmission Control Protocol/Internet Protocol (TCP/IP).

In the client/server model, the client may comprise an application executing on a computer that "connects" to the storage system over a computer network, such as a point-to-point link, shared local area network, wide area network or virtual private network implemented over a public network, such as the Internet. NAS systems generally utilize file-based access protocols; therefore, each client may request the services of the storage system by issuing file system protocol messages (in the form of packets) to the file system over the network identifying one or more files to be accessed without regard to specific locations, e.g., blocks, in which the data are stored on disk. By supporting a plurality of file system protocols, such as the conventional Common Internet File System (CIFS), the Network File System (NFS) and the Direct Access File System (DAFS) protocols, the utility of the storage system may be enhanced for networking clients.

A SAN is a high-speed network that enables establishment of direct connections between a storage system and its storage devices. The SAN may thus be viewed as an extension to a storage bus and, as such, an operating system of the storage system enables access to stored information using block-based access protocols over the "extended bus". In this context, the extended bus is typically embodied as Fibre Channel (FC) or Ethernet media adapted to operate with block access protocols, such as Small Computer Systems Interface (SCSI) protocol encapsulation over FC or TCP/IP/Ethernet.

A SAN arrangement or deployment allows decoupling of storage from the storage system, such as an application server, and some level of information storage sharing at the application server level. There are, however, environments wherein a SAN is dedicated to a single server. In some SAN deployments, the information is organized in the form of databases, while in others a file-based organization is employed. Where the information is organized as files, the client requesting the information maintains file mappings and manages file semantics, while its requests (and server responses) address the information in terms of block addressing on disk using, e.g., a logical unit number (LUN).

In some SAN environments, storage systems may export virtual disks (vdisks) to clients utilizing block-based protocols, such as, for example, Fibre Channel and iSCSI. One example of a vdisk is a special file type in a volume that derives from a plain file, but that has associated export controls and operation restrictions that support emulation of a disk. Vdisks are described further in U.S. Pat. No. 7,107,385, entitled STORAGE VIRTUALIZATION BY LAYERING VIRTUAL DISK OBJECTS ON A FILE SYSTEM, by Vijayan Rajan, et al., the contents of which are hereby incorporated by reference. These block-based protocols and the exported file/vdisks appear as physical disk devices to the clients of the storage system.

Certain file systems, including the exemplary write anywhere file layout (WAFL) file system available from Network Appliance, Inc, of Sunnyvale, Calif., include the capability to generate a thinly provisioned data container, wherein the data container is not completely written to disk at the time of its creation. As used herein, the term data container generally refers to a unit of storage for holding data, such as a file system, disk file, volume or a logical number (LUN), which is addressable by, e.g., its own unique identification. The storage space required to hold the data contents of the thinly provisioned data container on disk has not yet been used. The use of thinly provisioned data container is often utilized in the exemplary WAFL file system environment when, for example, a vdisk is initially generated. A user or administrator may generate a vdisk of specified size, for example, 10 gigabytes (GB). This size represents the maximum addressable space of the vdisk. To increase system performance, the file system generally does not write the entire vdisk to the disks at the time of creation. Instead, the file system generates a thinly provisioned data container (i.e., file) representing the vdisk. The thinly provisioned data container may then be populated (filled in) via subsequent write operations as the vdisk is filled in with data. While this description is written in terms of a thinly provisioned data container over and underlying file system, it should be noted that other thin provisioning implementations may be utilized. As such, the use of an underlying file system to support a thinly provisioned data container should be taken as exemplary only.

FIG. 1 is a schematic block diagram of an (inode structure) buffer tree 100 of an exemplary thinly provisioned data container. This (inode) buffer tree structure 100 is created when, for example, a vdisk is first created by the file system as thinly provisioned. In a typical thinly provisioned data container, only the inode 105 is actually written to disk. The remainder of the data container is not written to or otherwise physically stored on the disks storing the data container. The data container 100 includes a completed inode 105, however, it does not contain indirect blocks 110, 120 or file data blocks 125 (as shown in phantom). Thus, these phantom blocks (i.e., 110, 120, 125) are not generated when the data container is created, although, they will be written to disk as the data container is populated. By only writing the inode to disk when a thinly provisioned data container is generated, substantial time is saved as the number of disk accesses is reduced. Additionally, only the storage space on the disks that is needed to hold the contents of the data container are utilized. Illustratively, the file system will make appropriate space reservations to ensure that the entire thinly provisioned data container may be written to disk. Space reservation techniques are described in U.S. patent application Ser. No. 10/423,391, entitled SYSTEM AND METHOD FOR RESERVING SPACE TO GUARANTEE FILE WRITABILITY IN A FILE SYSTEM SUPPORTING PERSISTENT CONSISTENCY POINT IMAGES, by Peter F. Corbett, And now issued as U.S. Pat. No. 7,577,692, on Aug. 18, 2009.

FIG. 2 is a schematic block diagram of an exemplary (inode) buffer tree structure 200 of a partially filled in thinly provisioned data container that includes original inode 105. Here, indirect blocks 210, 220 and exemplary file data block 225 have been populated (filled in) in response to one or more write operations to the data container. Continued write operations will result in filling in additional data blocks, for example, file data block 325 as shown in the exemplary (inode) buffer tree structure 300 of FIG. 3. Eventually, when the data container has been completely filled, all blocks, including such blocks as indirect blocks 420 and associated file data blocks (not shown) will be completed as illustrated in the schematic block diagram of an exemplary inode structure 400 in FIG. 4. At such time, the thinly provisioned data container has been completely filled in and each block is associated with an actual block on disk.

A known environment for utilizing a storage system with a thinly provisioned data container, i.e., a thinly provisioned LUN, involves overlaying a host-side file system onto the thinly provisioned LUN. In such an environment, the host (or client of the storage system) includes a file system that utilizes the exported LUN as storage and maintains structured storage, e.g., a file system, on the blocks of the LUN. However, a noted disadvantage is that the host-side file system does not communicate status to the storage system concerning the deletion or deallocation of blocks within the LUN. Although the file system typically records appropriate metadata entries when a file is deleted, no status message is passed to the storage system that notifies the system that certain blocks of the LUN are no longer in use. Thus, while the LUN may dynamically grow by allocating additional blocks (up to its maximum number of addressable blocks) as needed, it will not deallocate blocks as files are deleted in the host-side file system. For example, if a LUN is generated with a maximum size of 100 GB and then a 50 GB file is written to it, the LUN will allocate 50 GB of space on the storage system. If the 50 GB file is thereafter deleted in the host-side file system, that file system records appropriate metadata entries and frees its file system pointers. However, the LUN will still occupy 50 GB of space on the storage system, even though the 50 GB is now unused space within the LUN.

SUMMARY OF THE INVENTION

The disadvantages of the prior art are overcome by providing a system and method for reclaiming unused storage space from a thinly provisioned data container, such as a logical unit number (LUN) of a storage system. A host-side agent executes on a client (host) of the storage system. The host-side agent detects which blocks have been freed from a host-side file system and sends a novel Punch Hole command to the storage system, which causes the storage system to deallocate certain ranges of blocks within the data container, thereby permitting the data container to shrink in size. The agent sends the Punch Hole command to the storage system via a conventional data pathway between the client and the storage system, e.g., as a vendor-specific SCSI command over a FCP connection.

In an alternate embodiment, the agent iteratively allocates a file on the host-side file system, locks the file and determines which blocks of the underlying data container on the storage system are supporting the locked file. The agent then sends the novel Punch Hole command to the storage system to deallocate the blocks associated with the locked file. By repeatedly performing this process and ensuring that the files are stored on differing blocks of the data container, the agent may ensure that all unused blocks of data container are freed.

Additionally, the agent may interface with a host-side application that does not implement a file system but utilizes some other form of structured storage, such as a database program. In such an embodiment, the agent queries the application to determine the nature of the structured storage utilized by the application and then sends one or more appropriate Punch Hole commands to the storage system to deallocate any unused blocks of the data container.

BRIEF DESCRIPTION OF THE DRAWINGS

The above and further advantages of the invention may be better understood by referring to the following description in conjunction with the accompanying drawings in which like reference numerals indicate identical or functionally similar elements.

DETAILED DESCRIPTION OF AN ILLUSTRATIVE EMBODIMENT

A. Storage Appliance

The present invention may be implemented, in the illustrative embodiment, on a storage appliance that serves both file and block protocol access to information stored on storage devices in an integrated manner. In this context, the term storage appliance denotes a computer having features such as simplicity of storage service management and ease of storage reconfiguration, including reusable storage space, for users (system administrators) and clients of network attached storage (NAS) and storage area network (SAN) deployments. The storage appliance may provide NAS services through a file system, while the same appliance provides SAN services through SAN virtualization, including logical unit number (LUN) emulation. While this description is written in terms of storage appliances, the principles of the present invention may be applied to any storage system. As such the use of storage appliances should be taken as exemplary only.

Figure 1:
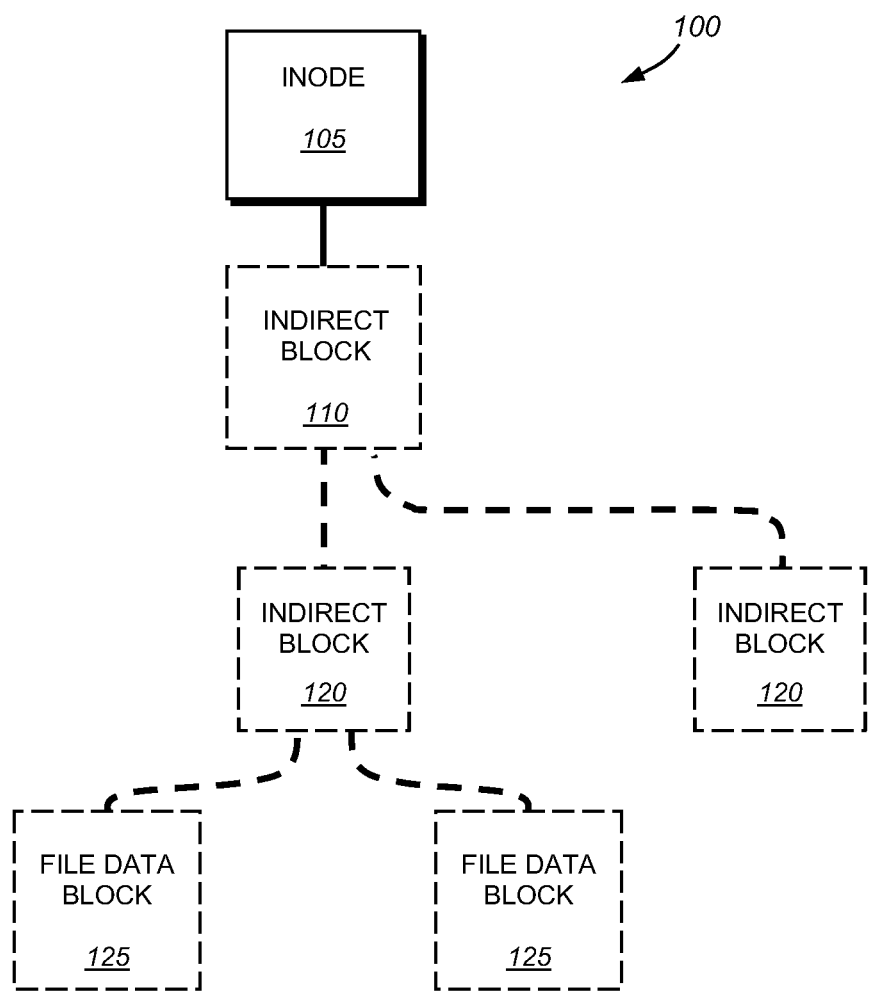
FIG. 1, already described, is a schematic block diagram of an exemplary thinly provisioned data container showing a inode for the data container.
Figure 2:
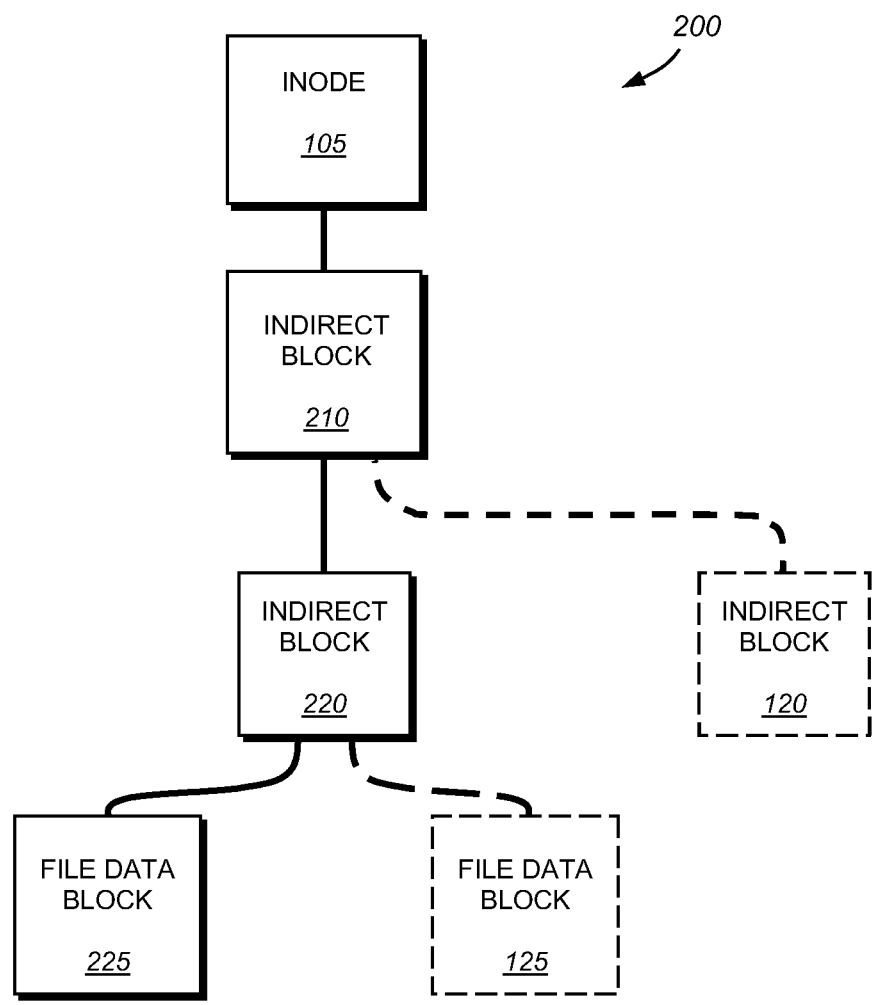
FIG. 2, already described, is a schematic block diagram of a partially filled in thinly provisioned data container in accordance with an embodiment of the present invention.
Figure 3:
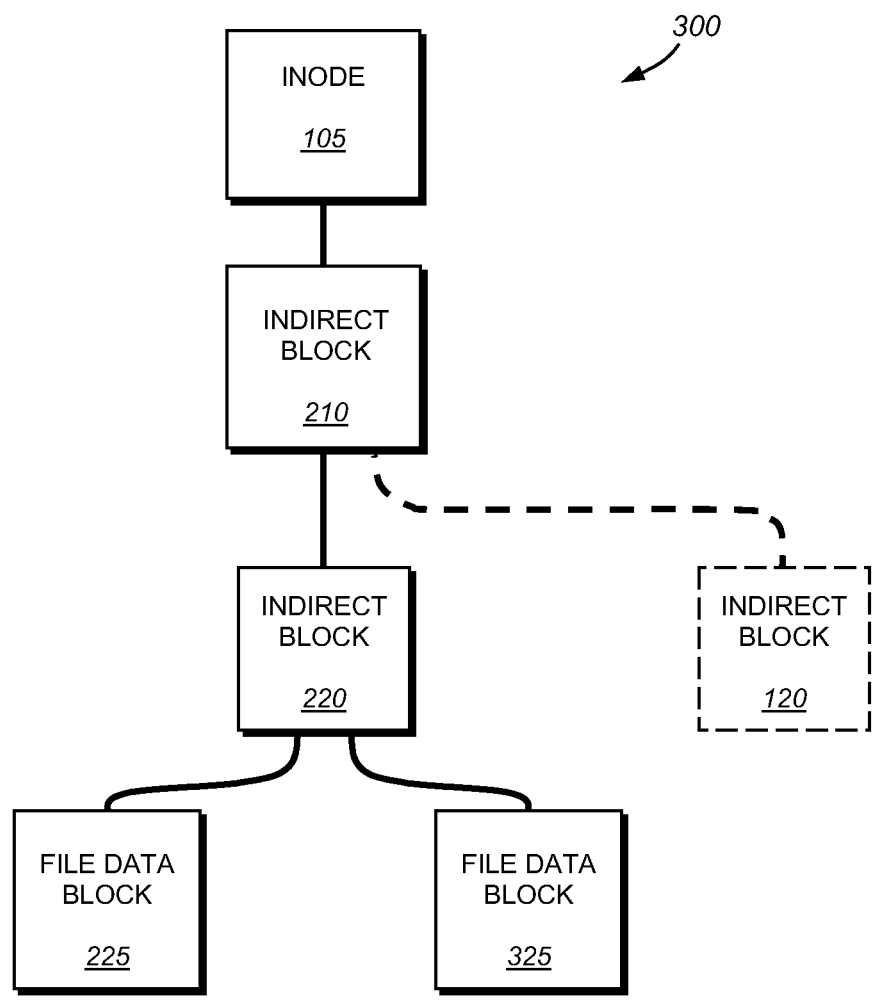
FIG. 3 is a schematic block diagram of a an exemplary partially filled in thinly provisioned data container in accordance with an embodiment of the present invention.
Figure 4:
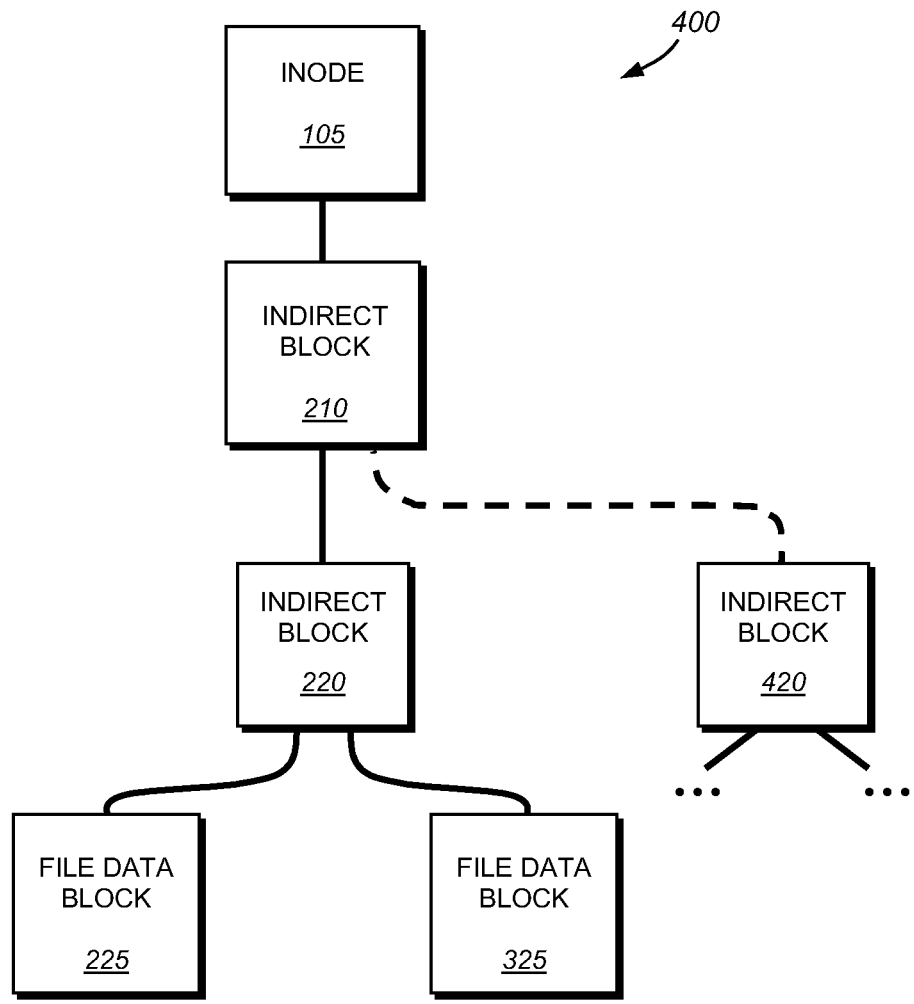
FIG. 4, already described, is a schematic block diagram of an exemplary filled in data container in accordance with an embodiment of the present invention.
Figure 5:
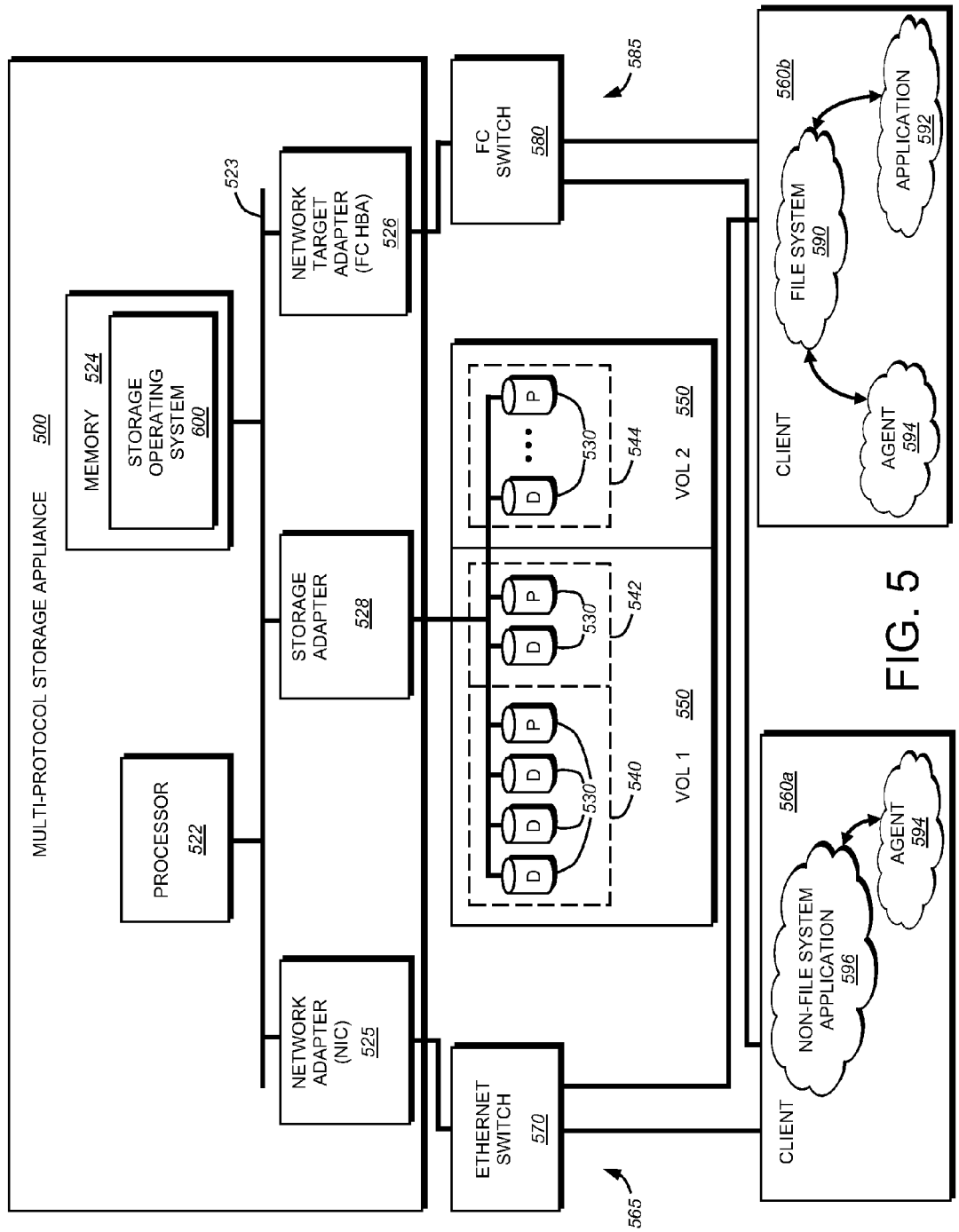
FIG. 5 is a schematic block diagram of an exemplary storage system in accordance with an embodiment of the present invention.

FIG. 5 is a schematic block diagram of a storage appliance 500 configured to provide storage service relating to the organization of information on storage devices, such as disks 530. The storage appliance 500 is illustratively embodied as a storage system comprising a processor 522, a memory 524, a plurality of network adapters 525, 526 and a storage adapter 528 interconnected by a system bus 523. The multi-protocol storage appliance 500 also includes a storage operating system 600 that provides a virtualization system (and, in particular, a file system) to logically organize the information as a hierarchical structure of named directory, file and virtual disk (vdisk) storage objects on the disks 530.

Whereas clients of a NAS-based network environment have a storage viewpoint of files, the clients of a SAN-based network environment have a storage viewpoint of blocks or disks. To that end, the storage appliance 500 presents (exports) disks to SAN clients through the creation of logical unit numbers (LUNs) or vdisk objects. A vdisk object (hereinafter "vdisk") is a special file type that is implemented by the virtualization system and translated into an emulated disk as viewed by the SAN clients. The storage appliance thereafter makes these vdisks accessible to the SAN clients through controlled exports, as described further herein.

In the illustrative embodiment, the memory 524 comprises storage locations that are addressable by the processor and adapters for storing software program code and data structures associated with the present invention. The processor and adapters may, in turn, comprise processing elements and/or logic circuitry configured to execute the software code and manipulate the data structures. The storage operating system 600, portions of which are typically resident in memory and executed by the processing elements, functionally organizes the storage appliance by, inter alia, invoking storage operations in support of the storage service implemented by the appliance. It will be apparent to those skilled in the art that other processing and memory means, including various computer readable media, may be used for storing and executing program instructions pertaining to the inventive system and method described herein.

The network adapter 525 couples the storage appliance to a plurality of clients 560a,b over point-to-point links, wide area networks, virtual private networks implemented over a public network (Internet) or a shared local area network, hereinafter referred to as an illustrative Ethernet network 565. Therefore, the network adapter 525 may comprise a network interface card (NIC) having the mechanical, electrical and signaling circuitry needed to connect the appliance to a network switch, such as a conventional Ethernet switch 570. For this NAS-based network environment, the clients are configured to access information stored on the multi-protocol appliance as files. The clients 560 communicate with the storage appliance over network 565 by exchanging discrete frames or packets of data according to pre-defined protocols, such as the Transmission Control Protocol/Internet Protocol (TCP/IP).

The clients 560 may be general-purpose computers configured to execute applications over a variety of operating systems, including the UNIX® and Microsoft® Windows™ operating systems. Client systems generally utilize file-based access protocols when accessing information (in the form of files and directories) over a NAS-based network. Therefore, each client 560 may request the services of the storage appliance 500 by issuing file access protocol messages (in the form of packets) to the appliance over the network 565. It will be apparent to those skilled in the art that other clients running other types of operating systems may also communicate with the integrated multi-protocol storage appliance using other file access protocols.

Illustratively, client (or host) 560b includes a file system 590 that interfaces with one or more applications 592. The host-side file system 590 illustratively implements a file system overlaid onto a data container serviced by the storage system. For example, the storage system may export a LUN, which the host-side file system 590 utilizes to store data. In an illustrative embodiment, a novel host-side agent 594 also executes on client 560b. According to the invention, the agent 594 blocks of a thinly provisioned data container may be reclaimed and by sending a novel Punch Hole command to the storage system, as described further below. Alternately, a non-file system application 596 executing on client 560a, which application 596 may comprise a database system or other system. In accordance with an alternate embodiment of the present invention, the novel agent 594 may also execute on client 560a The storage network "target" adapter 526 also couples the multi-protocol storage appliance 500 to clients 560 that may be further configured to access the stored information as blocks or disks. For this SAN-based network environment, the storage appliance is coupled to an illustrative Fibre Channel (FC) network 585. FC is a networking standard describing a suite of protocols and media that is primarily found in SAN deployments. The network target adapter 526 may comprise a FC host bus adapter (HBA) having the mechanical, electrical and signaling circuitry needed to connect the appliance 100 to a SAN network switch, such as a conventional FC switch 580. In addition to providing FC access, the FC HBA may offload Fibre Channel network processing operations for the storage appliance.

The clients 560 generally utilize block-based access protocols, such as the Small Computer Systems Interface (SCSI)

protocol, when accessing information (in the form of blocks, disks or vdisks) over a SAN-based network. SCSI is a peripheral input/output (I/O) interface with a standard, device independent protocol that allows different peripheral devices, such as disks 530, to attach to the storage appliance 500. In SCSI terminology, clients 560 operating in a SAN environment are initiators that initiate requests and commands for data. The multi-protocol storage appliance is thus a target configured to respond to the requests issued by the initiators in accordance with a request/response protocol. The initiators and targets have endpoint addresses that, in accordance with the FC protocol, comprise worldwide names (WWN). A WWN is a unique identifier, e.g., a node name or a port name, consisting of an 8-byte number.

The storage appliance 500 supports various SCSI-based protocols used in SAN deployments, including SCSI encapsulated over TCP (iSCSI) and SCSI encapsulated over FC (FCP). The initiators (hereinafter clients 560) may thus request the services of the target (hereinafter storage appliance 500) by issuing iSCSI and FCP messages over the network 565, 585 to access information stored on the disks. It will be apparent to those skilled in the art that the clients may also request the services of the integrated multi-protocol storage appliance using other block access protocols. By supporting a plurality of block access protocols, the multi-protocol storage appliance provides a unified and coherent access solution to vdisks/LUNs in a heterogeneous SAN environment.

The storage adapter 528 cooperates with the storage operating system 600 executing on the storage appliance to access information requested by the clients. The information may be stored on the disks 530 or other similar media adapted to store information. The storage adapter includes I/O interface circuitry that couples to the disks over an I/O interconnect arrangement, such as a conventional high-performance, FC serial link topology. The information is retrieved by the storage adapter and, if necessary, processed by the processor 522 (or the adapter 528 itself) prior to being forwarded over the system bus 523 to the network adapters 525, 526, where the information is formatted into packets or messages and returned to the clients.

Storage of information on the appliance 500 is preferably implemented as one or more storage volumes (e.g., VOL1-2 550) that comprise a cluster of physical storage disks 530, defining an overall logical arrangement of disk space. The disks within a volume are typically organized as one or more groups of Redundant Array of Independent (or Inexpensive) Disks (RAID). RAID implementations enhance the reliability/integrity of data storage through the writing of data "stripes" across a given number of physical disks in the RAID group, and the appropriate storing of redundant information with respect to the striped data. The redundant information enables recovery of data lost when a storage device fails. It will be apparent to those skilled in the art that other redundancy techniques, such as mirroring, may be used in accordance with the present invention.

Specifically, each volume 550 is constructed from an array of physical disks 530 that are organized as RAID groups 540, 542, and 544. The physical disks of each RAID group include those disks configured to store striped data (D) and those configured to store parity (P) for the data, in accordance with an illustrative RAID 4 level configuration. It should be noted that other RAID level configurations (e.g. RAID 5) are also contemplated for use with the teachings described herein. In the illustrative embodiment, a minimum of one parity disk and one data disk may be employed.

B. Storage Operating System

To facilitate access to the disks 530, the storage operating system 600 implements a write-anywhere file system of a virtualization system that "virtualizes" the storage space provided by disks 530. The file system logically organizes the information as a hierarchical structure of named directory and file objects (hereinafter "directories" and "files") on the disks. Each "on-disk" file may be implemented as set of disk blocks configured to store information, such as data, whereas the directory may be implemented as a specially formatted file in which names and links to other files and directories are stored. The virtualization system allows the file system to further logically organize information as a hierarchical structure of named vdisks on the disks, thereby providing an integrated NAS and SAN appliance approach to storage by enabling file-based (NAS) access to the named files and directories, while further enabling block-based (SAN) access to the named vdisks on a file-based storage platform. The file system simplifies the complexity of management of the underlying physical storage in SAN deployments.

As noted, a vdisk is a special file type in a volume that derives from a plain (regular) file, but that has associated export controls and operation restrictions that support emulation of a disk. Unlike a file that can be created by a client using, e.g., the NFS or CIFS protocol, a vdisk is created on the storage appliance via, e.g. a user interface (UI) as a special typed file (object). Illustratively, the vdisk is a multi-inode object comprising a special file inode that holds data and at least one associated stream inode that holds attributes, including security information. The special file inode functions as a main container for storing data, such as application data, associated with the emulated disk. The stream inode stores attributes that allow LUNs and exports to persist over, e.g., reboot operations, while also enabling management of the vdisk as a single disk object in relation to SAN clients. An example of a vdisk and its associated inodes that may be advantageously used with the present invention is described in U.S. Pat. No. 7,107,385, entitled STORAGE VIRTUALIZATION BY LAYERING VDISKS ON A FILE SYSTEM, by which application is hereby incorporated by reference as though fully set forth herein.

In accordance with an illustrative embodiment of the present invention, when a vdisk is generated it is typically created as a thinly provisioned data container. However, the storage operating system will also reserve the appropriate amount of storage space to fill the "holes" of the newly generated vdisk. This space reservation technique ensures that there is sufficient space on the disks to completely fill in the data container. Exemplary space reservation policies and techniques are further described in U.S. patent application Ser. No. 10/423,391, entitled SYSTEM AND METHOD FOR RESERVING SPACE TO GUARANTEE FILE WRITABILITY IN A FILE SYSTEM SUPPORTING PERSISTENT CONSISTENCY POINT IMAGES, by Peter F. Corbett, et al., and now issued as U.S. Pat. No. 7,577,692, on Aug. 18, 2009.

In the illustrative embodiment, the storage operating system is preferably the NetApp® Data ONTAP™ operating system available from Network Appliance, Inc., Sunnyvale, Calif. that implements a Write Anywhere File Layout (WAFL™) file system. However, it is expressly contemplated that any appropriate storage operating system, including a write in-place file system, may be enhanced for use in accordance with the inventive principles described herein. As such, where the term "WAFL" is employed, it should be taken broadly to refer to any file system that is otherwise adaptable to the teachings of this invention.

As used herein, the term "storage operating system" generally refers to the computer-executable code operable on a computer that manages data access and may, in the case of a multi-protocol storage appliance, implement data access semantics, such as the Data ONTAP storage operating system, which is implemented as a microkernel. The storage operating system can also be implemented as an application program operating over a general-purpose operating system, such as UNIX® or Windows NT®, or as a general-purpose operating system with configurable functionality, which is configured for storage applications as described herein.

In addition, it will be understood to those skilled in the art that the inventive system and method described herein may apply to any type of special-purpose (e.g., storage serving appliance) or general-purpose computer, including a standalone computer or portion thereof, embodied as or including a storage system. Moreover, the teachings of this invention can be adapted to a variety of storage system architectures including, but not limited to, a network-attached storage environment, a storage area network and disk assembly directly-attached to a client or host computer. The term "storage system" should therefore be taken broadly to include such arrangements in addition to any subsystems configured to perform a storage function and associated with other equipment or systems.

Figure 6:
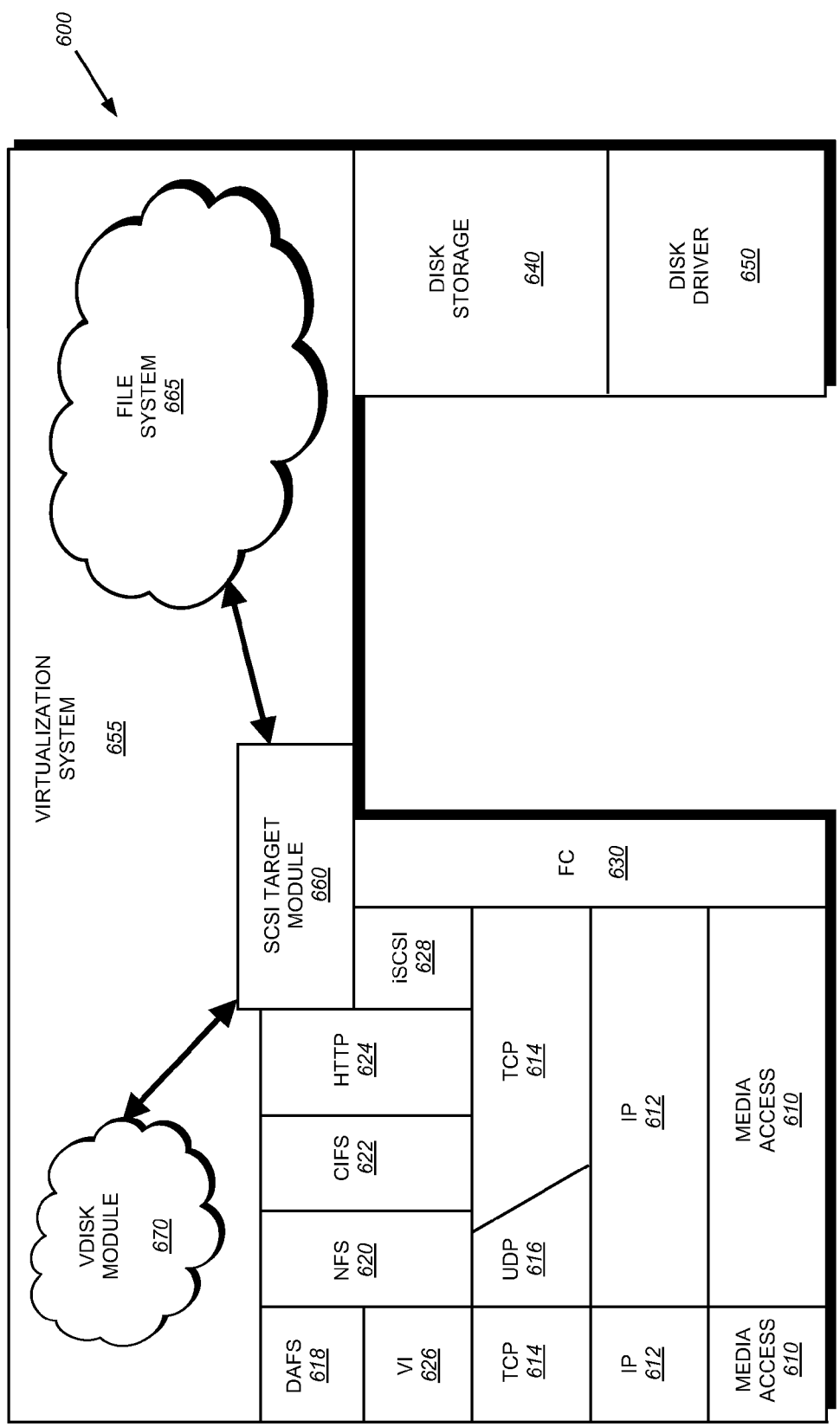
FIG. 6 is a schematic block diagram of an exemplary storage operating system for use with the storage system of FIG. 5 in accordance with an embodiment of the present invention.

FIG. 6 is a schematic block diagram of an exemplary storage operating system 600 that may be advantageously used with the present invention. The storage operating system comprises a series of software layers organized to form an integrated network protocol stack or, more generally, a multi-protocol engine that provides data paths for clients to access information stored on the multi-protocol storage appliance using block and file access protocols. The protocol stack includes a media access layer 610 of network drivers (e.g., gigabit Ethernet drivers) that interfaces to network protocol layers, such as the IP layer 612 and its supporting transport mechanisms, the TCP layer 614 and the User Datagram Protocol (UDP) layer 616. A file system protocol layer provides multi-protocol file access and, to that end, includes support for the DAFS protocol 618, the NFS protocol 620, the CIFS protocol 622 and the Hypertext Transfer Protocol (HTTP) protocol 624. A Virtual Interface (VI) layer 626 implements the VI architecture to provide direct access transport (DAT) capabilities, such as RDMA, as required by the DAFS protocol 618.

An iSCSI driver layer 628 provides block protocol access over the TCP/IP network protocol layers, while a FC driver layer 630 operates with the FC HBA 526 to receive and transmit block access requests and responses to and from the integrated storage appliance. The FC and iSCSI drivers provide FC-specific and iSCSI-specific access control to the LUNs (vdisks) and, thus, manage exports of vdisks to either iSCSI or FCP or, alternatively, to both iSCSI and FCP when accessing a single vdisk on the multi-protocol storage appliance. In addition, the storage operating system includes a disk storage layer 640 that implements a disk storage protocol, such as a RAID protocol, and a disk driver layer 650 that implements a disk access protocol such as, e.g., a SCSI protocol.

Bridging the disk software layers with the integrated network protocol stack layers is a virtualization system 655 that is implemented by a file system 665 cooperating with virtualization modules illustratively embodied as, e.g., vdisk module 670 and SCSI target module 660. It should be noted that the vdisk module 670, file system 665 and SCSI target module 660 can be implemented in software, hardware, firmware, or a combination thereof. The vdisk module 670 is layered on (and interacts with) the file system 665 to provide a data path from the block-based SCSI target module to blocks managed by the file system. In essence, the vdisk module 670 manages SAN deployments by, among other things, implementing a comprehensive set of vdisk (LUN) commands issued through a user interface by a system administrator. These vdisk commands are converted to primitive file system operations ("primitives") that interact with the file system 665 and the SCSI target module 660 to implement the vdisks.

The SCSI target module 660, in turn, initiates emulation of a disk or LUN by providing a mapping procedure that translates logical block access to LUNs specified in access requests into virtual block access to the special vdisk file types and, for responses to the requests, vdisks into LUNs. The SCSI target module is illustratively disposed between the FC and iSCSI drivers 630, 628 and the file system 665 to thereby provide a translation layer of the virtualization system 655 between the SAN block (LUN) space and the file system space, where LUNs are represented as vdisks. Additionally, in the illustrative embodiment, the SCSI target module 660 interprets a novel received Punch Hole command from a host-side agent and implements deallocation of blocks, in conjunction with the file system 665 and vdisk module 670, that are no longer in use. As described further below, the novel Punch Hole command permits a thinly provisioned data container to reduce the number of blocks currently allocated by it as the amount of structured storage overlaid onto the data container decreases.

The file system 665 illustratively implements the above-described WAFL file system having an on-disk format representation that is block-based using, e.g., 4 kilobyte (kB) blocks and using inodes to describe the files. Broadly stated, all inodes of the file system are organized into the inode file. A file system (fs) info block specifies the layout of information in the file system and includes an inode of a file that includes all other inodes of the file system. Each volume has an fsinfo block that is preferably stored at a fixed location within, e.g., a RAID group of the file system. The inode of the root fsinfo block may directly reference (point to) blocks of the inode file or may reference indirect blocks of the inode file that, in turn, reference direct blocks of the inode file. Within each direct block of the inode file are embedded inodes, each of which may reference indirect blocks that, in turn, reference data blocks of a file or vdisk.

It should be noted that the software "path" through the storage operating system layers described above needed to perform data storage access for the client request received at the multi-protocol storage appliance may alternatively be implemented in hardware. That is, in an alternate embodiment of the invention, a storage access request data path through the operating system layers (including the virtualization system 655) may be implemented as logic circuitry embodied within a field programmable gate array (FPGA) or an application specific integrated circuit (ASIC). This type of hardware implementation increases the performance of the storage service provided by appliance 500 in response to a file access or block access request issued by a client 560. Moreover, in another alternate embodiment of the invention, the processing elements of network and storage adapters 525-528 may be configured to offload some or all of the packet processing and storage access operations, respectively, from processor 522 to thereby increase the performance of the storage service provided by the multi-protocol storage appliance. It is expressly contemplated that the various processes, architectures and procedures described herein can be implemented in hardware, firmware or software.

C. Reclaiming Unused Space from a Thinly Provisioned Data Container

The present invention is directed to a system and method for reclaiming unused storage space from a thinly provisioned data container. The invention enables a thinly provisioned data container stored on a storage system to reduce the number of blocks allocated to it as the structured storage e.g., a host side file system overlaid onto the data container decreases. In an illustrative embodiment, a host-side agent executes on a client of the storage system and determines appropriate blocks that may be reclaimed due to the overlaid structured storage no longer utilizing them. The agent then generates the novel Punch Hole command and sends it to the storage system using the conventional data pathway between the client and the storage system. Illustratively, the Punch Hole command is implemented as a vendor-specific SCSI command but, in alternate embodiments, may be implemented using other techniques. For clients utilizing a non-file system application, such as a database application, the host-side agent interfaces with the application to determine appropriate blocks of the data container that may be reclaimed due to the host-side application no longer utilizing the storage space. The agent then generates and sends the appropriate Punch Hole command to the storage system.

Figure 7A:
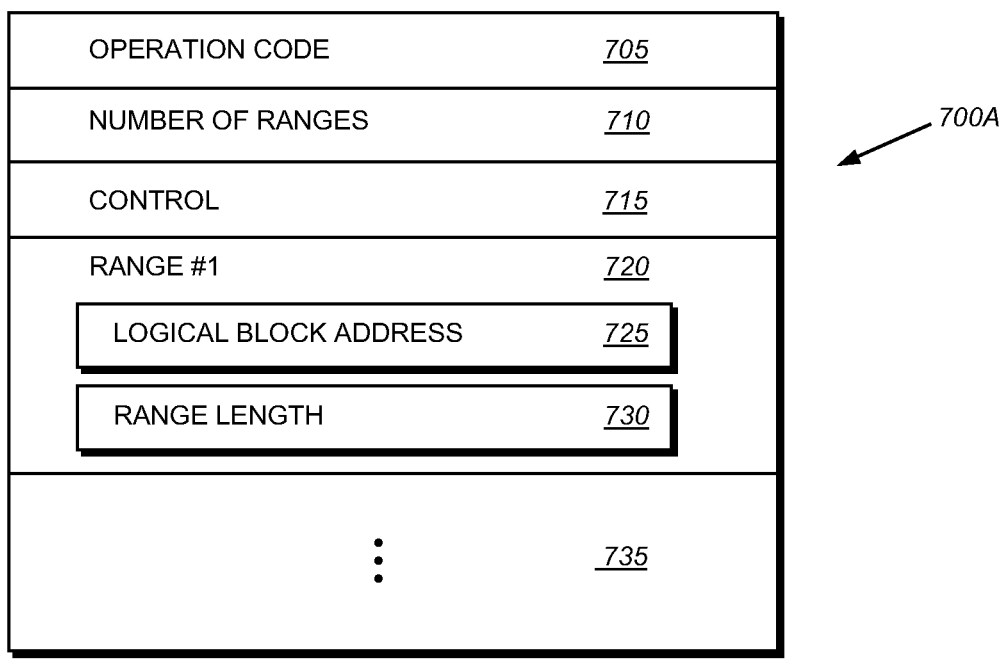
FIG. 7A is a schematic block diagram of the format of an exemplary Punch Hole command structure in accordance with an embodiment of the present invention.

FIG. 7A is a schematic block diagram of the format of the novel Punch Hole command structure 700A in accordance with an embodiment of the present invention. As noted, the Punch Hole command is illustratively implemented as a vendor specific SCSI command. However, it should be noted that the Punch Hole command may be implemented in other ways including, for example, implementing the command into another protocol specification. The Punch Hole command structure 700A includes an operation code field 705, a number of a ranges field 710, a control field 715, a first range field 720 that includes a logical block address field 725 and a range length field 730 and, in alternate embodiments, additional field 735. The operation code field 705 identifies the command as a Punch Hole command. The number of ranges field 710 identifies the number of range values included in this command. The control field 715 is utilized to pass control information to the storage system. The first range field 720 includes two sub fields, namely, a logical block address field 725 and a range length field 730. The logical block address field 725 identifies the starting point of the range of blocks to be allocated, whereas the range length field 730 identifies the number of blocks to be deallocated. In the illustrative embodiment, there are as many range fields, such as first range field 720, as there are identified ranges in the number of ranges field 710. The Punch Hole command 700A identifies one or more ranges of blocks, each starting at the logical block address identified in field 725 and continuing on for the number of blocks identified in field 730.

Figure 7B:
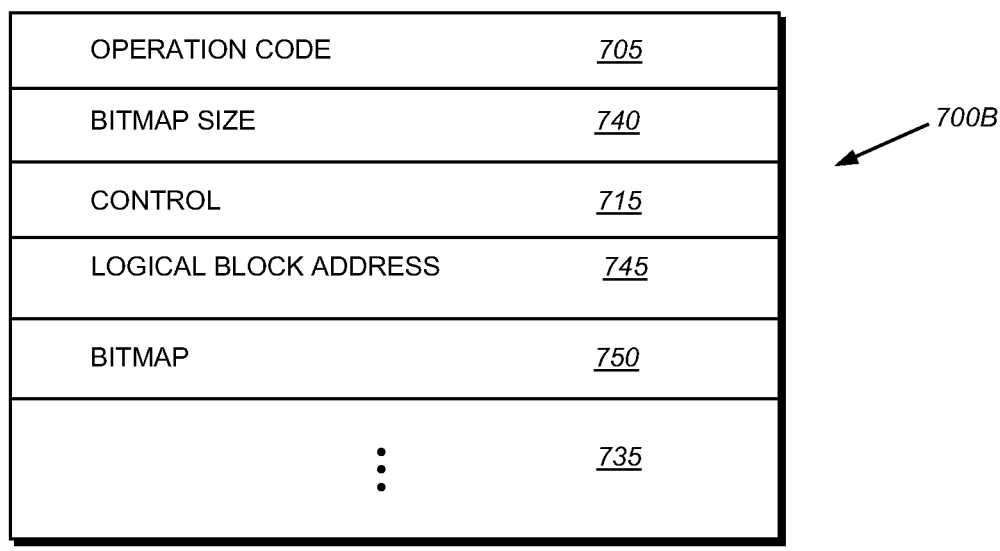
FIG. 7B is a schematic block diagram of the format of an exemplary Punch Hole command structure in accordance with an embodiment of the present invention.

Similarly, FIG. 7B is a schematic block diagram of the format of the Punch Hole command structure 700B in accordance with an alternate embodiment of the present invention. The Punch Hole command structure 700B includes an operation code field 705, a bitmap size field 740, a control field 715, a logical block address field 745, a bitmap field 750 and, in alternate embodiments, additional field 735. The operation code field 705 identifies the command as a Punch Hole command. The bitmap size field 740 identifies the size of the bitmap contained in bitmap field 750. The control field 715 is utilized to pass control information to the storage system. The logical block address field 745 identifies a starting block address. The bitmap field 750 contains a bitmap wherein each bit represents a single block. In this alternate embodiment, the storage system determines which block to deallocate by adding the offset of the bit in the bitmap to the logical block address contained in the command. If the bit is set, the corresponding block is deallocated. As noted above, these illustrative command structures 700A,B are exemplary only. The novel Punch Hole command may be implemented using other structures as will be appreciated by one skilled in the art.

Figure 8:
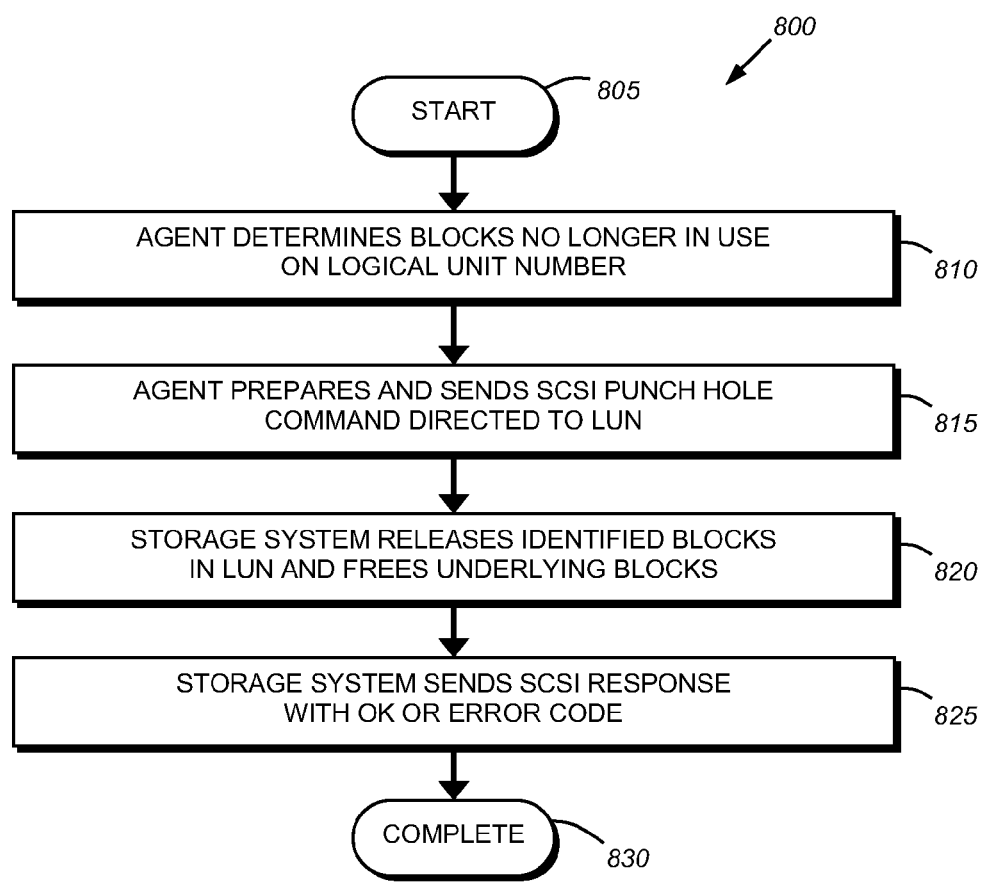
FIG. 8 is a flowchart detailing the steps of a procedure for reclaiming unused space in a thinly provisioned data container in accordance with an embodiment of the present invention.

FIG. 8 is a flowchart detailing the steps of a procedure 800 for reclaiming unused space from a thinly provisioned data container in accordance with an embodiment of the present invention. The data container is illustratively described herein as a logical unit number (LUN); however, it should be noted that any suitable data container may be utilized in accordance with the principles of the present invention. As such, the term LUN should not be taken to be limiting and any suitable data container may be utilized. The procedure 800 begins in step 805 and continues to step 810 where the agent executing on a client of the storage system determines that blocks are no longer in use on the LUN. This may occur by, for example, the host-side agent querying the file system or by examining file system metadata to determine blocks that have been freed within the file system. Alternately, in embodiments where the host-side agent is executing on a client utilizing a non-file system application, the agent may determine that blocks are no longer in use on the LUN by querying the application and/or analyzing its structured storage metadata.

Upon identifying a number of blocks that are no longer in use on the LUNs, the agent generates and sends a novel Punch Hole command directed to the LUN (step 815). The generated Punch Hole command identifies the appropriate ranges of blocks to be freed. The Punch Hole command is typically sent via the conventional data pathway between the client and the storage system. For example, if the client normally communicates using FCP with the storage system, the agent will generate a Punch Hole command and send it using the FCP protocol. In response, the storage system releases the identified ranges of a blocks in the LUN and deallocates the underlying blocks to be reused by the storage system (step 820). These blocks are typically deallocated by updating appropriate file system metadata to show that they may be re-used by the file system. Additionally, any pointers to the blocks, such as pointers in high level indirect blocks are cleared. In step 825, the storage system replies with a response message either acknowledging that the command was successful or with an appropriate error code. The procedure then completes in step 830.

Figure 9:
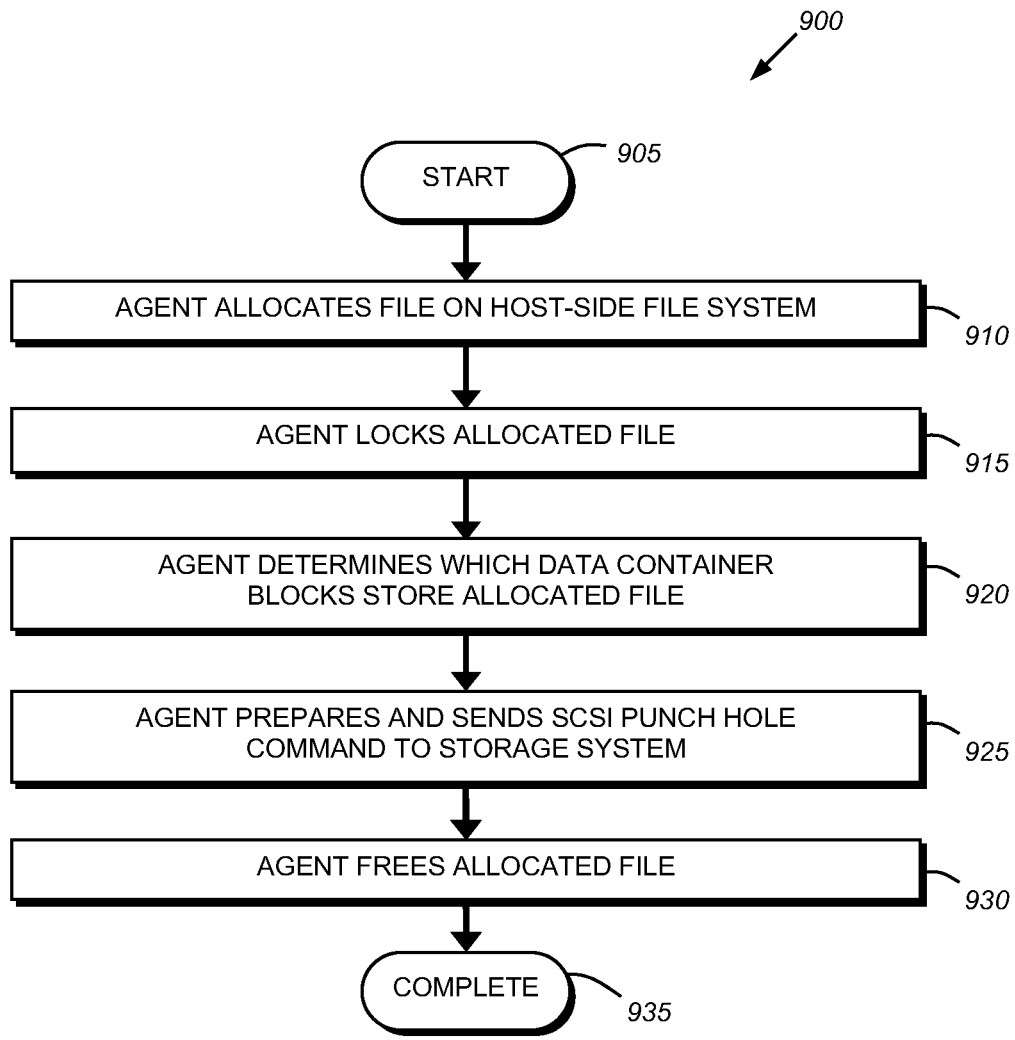
FIG. 9 is a flowchart detailing the steps of a procedure for reclaiming unused space in a thinly provisioned data container in accordance with an embodiment of the present invention.

In an alternate embodiment, the agent is more proactive regarding the identification of blocks that may be freed. FIG. 9 is a flowchart detailing the steps of a procedure 900 for reclaiming unused space from a thinly provisioned data container in accordance with an alternate embodiment of the invention. The procedure 900 begins in step 905 continues to step 910 where the agent allocates a file on the host-side file system. This may be accomplished using conventional file system operation commands to generate a file of a predetermined size. In step 915, the agent locks the allocated file so that no operations may be directed to it. This lock may be generated using conventional host-side file system commands. In step 920, the agent determines which data container blocks store the allocated file, by, e.g., using conventional file system operations to determine the location within the file system of a particular file. In step 925, the agent prepares and sends a Punch Hole command to the storage system identifying the ranges of blocks in which the allocated file resides. The agent then frees the allocated file in step 930 before the procedure completes in step 935. By freeing the allocated file, the host-side file system updates the appropriate pointers to indicate that the blocks previously utilized by the file are no longer in use. Similarly, as result of the Punch Hole command being processed by the storage system, the underlying blocks of the data container of the storage system are also freed and may be reutilized by the storage system.

To again summarize, the present invention provides a system and method for reclaiming unused space in a thinly provisioned data container on a storage system. A host-side agent determines blocks of the structured storage of the client that may be de-allocated on the data container by, e.g., querying the host-side file system or by creating a file and determining the blocks storing the created file. The agent then generates a novel Punch Hole command identifying the blocks to be de-allocated on the data container and sends the Punch Hole command to the storage system serving the data container. In response to receiving the Punch Hole command, the storage system deallocates the identified blocks (or ranges of blocks) on the data container so that the data container consumes less storage space, thereby enabling the container to dynamically grow and shrink in accordance with the amount of data being stored thereon.

The foregoing description has been directed to specific embodiments of this invention. It will be apparent, however, that other variations and modifications may be made to the described embodiments, with the attainment of some or all of their advantages. For example, it is expressly contemplated that the teachings of this invention can be implemented as software, including a computer-readable medium having program instructions executing on a computer, hardware, firmware, or a combination thereof. Additionally, while this description is written in terms of a thinly provisioned data container over and underlying file system, it should be noted that other thin provisioning implementations may be utilized. As such, the use of an underlying file system to support a thinly provisioned data container should be taken as exemplary only. Accordingly this description is to be taken only by way of example and not to otherwise limit the scope of the invention. It is thus the object of the appended claims to cover all such variations and modifications as come within the true spirit and scope of the invention.

What is claimed is:

1. A method for operating a storage system, comprising:
   maintaining a client computer interacting with the storage system, the client computer storing data on a data container on a storage device of the storage system;
   locating, by a client-side agent executing on the client computer that examines metadata of the client computer, one or more sets of blocks allocated in the client computer on the data container of the storage system, wherein locating further comprises:
   allocating a file on a client computer file system overlaid onto the data container;
   locking the allocated file;
   identifying blocks storing the allocated file on the storage system; and
   identifying, as the one or more sets of blocks within the storage system,
   the identified blocks storing the allocated file;
   sending a command to the storage system from the client computer identifying the allocated blocks within the storage system; and
   deallocating, in response to receiving the command, the identified blocks within the storage system.

2. The method of claim 1 wherein the data container comprises a thinly provisioned data container.

3. The method of claim 1 wherein the data container comprises a virtual disk.

4. The method of claim 1 wherein the command is a punch hole command.

5. The method of claim 4 wherein the punch hole command comprises a small computer systems interface (SCSI) command.

6. The method of claim 4 wherein the punch hole command comprises an operation code field, a bitmap size field, a logical block address field and a bitmap field.

7. The method of claim 4 wherein the punch hole command comprises an operation code field, a number of ranges field and one or more range identifier fields.

8. The method of claim 7 wherein the range identifier fields comprise a logical block address field and a range length field.

9. The method of claim 1 wherein determining the one or more sets of blocks comprises querying a file system on the client computer.

10. The method of claim 1 wherein examining the metadata comprises querying a file system on the client computer.

11. The method of claim 1 wherein locating the one or more sets of blocks within the data container comprises querying a non-file system application utilizing the data container.

12. A computer data storage system, comprising:
   a processor of the computer data storage system configured to execute a storage operating system to store data associated with a client computer on a data container of a storage device;
   a client-side agent executing on the client computer configured to locate, by examining metadata of the client computer, one or more sets of blocks allocated in the data container of the computer data storage system, wherein the client-side agent is further configured to:
   allocate a file on a client computer file system overlaid onto the data container;
   lock the allocated file;
   identify blocks storing the allocated file on the computer data storage system; and
   identify, as the one or more sets of deleted blocks within the computer data storage system, the identified blocks storing the allocated file;
   the client-side agent further configured to send a command to the computer data storage system to identify the allocated blocks within the computer data storage system; and
   the computer data storage system configured to deallocate, in response to receiving the command, the identified blocks in the data container of the computer data storage system.

13. The computer data storage system of claim 12 wherein the data container comprises a logical unit number.

14. The computer data storage system of claim 12 wherein the command comprises an operation code field, a bitmap size field, a logical block address field and a bitmap field.

15. The computer data storage system of claim 12 wherein the command comprises an operation code field, a number of ranges field and one or more range identifier fields.

16. The computer data storage system of claim 15 wherein the range identifier fields comprise a logical block address field and a range length field.

17. A non-transitory computer-readable storage medium containing executable program instructions for execution by a processor, comprising:
   program instructions that maintain a client computer interacting with a storage system, the client computer storing data on a data container on a storage device of the storage system;
   program instructions that locate, by a client-side agent executing on the client computer that examines metadata of the client computer, one or more sets of blocks allocated in the client computer on the data container of the storage system;

program instructions that allocate a file on a client computer file system overlaid onto the data container;

program instructions that lock the allocated file;

program instructions that identify blocks storing the allocated file on the computer data storage system; and program instructions that identify, as the one or more sets of deleted blocks within the storage system, the identified blocks storing the allocated file;

program instructions that send a command from the client computer identifying the allocated blocks within the storage system; and program instructions that deallocate, in response to receiving the command, the identified blocks within the storage system.

* * * * *